United States Patent [19]
Carpenter et al.

[11] Patent Number: 6,148,361
[45] Date of Patent: Nov. 14, 2000

[54] INTERRUPT ARCHITECTURE FOR A NON-UNIFORM MEMORY ACCESS (NUMA) DATA PROCESSING SYSTEM

[75] Inventors: Gary Dale Carpenter, Pflugerville; Philippe Louis deBacker, Austin; Mark Edward Dean, Austin; David Brian Glasco, Austin; Ronald Lynn Rockhold, Austin, all of Tex.

[73] Assignee: International Business Machines Corporation, Armonk, N.Y.

[21] Appl. No.: 09/213,998

[22] Filed: Dec. 17, 1998

[51] Int. Cl.[7] ........................................................ G06F 13/24
[52] U.S. Cl. ........................... 710/260; 710/261; 710/262; 710/263; 710/264; 710/265; 710/266; 710/267; 710/268; 710/269; 712/1
[58] Field of Search ..................................... 710/260–269; 712/1

[56] References Cited

U.S. PATENT DOCUMENTS

| | | | |
|---|---|---|---|
| 4,276,594 | 6/1981 | Morley | 364/200 |
| 4,769,768 | 9/1988 | Bomba et al. | 710/268 |
| 4,914,571 | 4/1990 | Baratz et al. | 707/10 |
| 5,283,904 | 2/1994 | Carson et al. | 710/266 |
| 5,379,434 | 1/1995 | DiBrino | 710/264 |
| 5,606,703 | 2/1997 | Brady et al. | 710/264 |
| 5,701,495 | 12/1997 | Arndt et al. | 710/263 |

OTHER PUBLICATIONS

Advanced Micro Devices and Cyrix Corporation, "The Open Programmable Interrupt Controller (PIC) Register Interface Specification" Revision 1.2, Oct. 1995 pp. 1–24.

*Primary Examiner*—John A. Follansbee
*Assistant Examiner*—Nabil El-Hady
*Attorney, Agent, or Firm*—Casimer K. Salys; Felsman, Bradley, Vaden, Gunter & Dillon, LLP

[57] ABSTRACT

A non-uniform memory access (NUMA) computer system includes at least two nodes coupled by a node interconnect, where at least one of the nodes includes a processor for servicing interrupts. The nodes are partitioned into external interrupt domains so that an external interrupt is always presented to a processor within the external interrupt domain in which the interrupt occurs. Although each external interrupt domain typically includes only a single node, interrupt channeling or interrupt funneling may be implemented to route external interrupts across node boundaries for presentation to a processor. Once presented to a processor, interrupt handling software may then execute on any processor to service the external interrupt. Servicing external interrupts is expedited by reducing the size of the interrupt handler polling chain as compared to prior art methods. In addition to external interrupts, the interrupt architecture of the present invention supports inter-processor interrupts (IPIs) by which any processor may interrupt itself or one or more other processors in the NUMA computer system. IPIs are triggered by writing to memory mapped registers in global system memory, which facilitates the transmission of IPIs across node boundaries and permits multicast IPIs to be triggered simply by transmitting one write transaction to each node containing a processor to be interrupted. The interrupt hardware within each node is also distributed for scalability, with the hardware components communicating via interrupt transactions conveyed across shared communication paths.

26 Claims, 9 Drawing Sheets

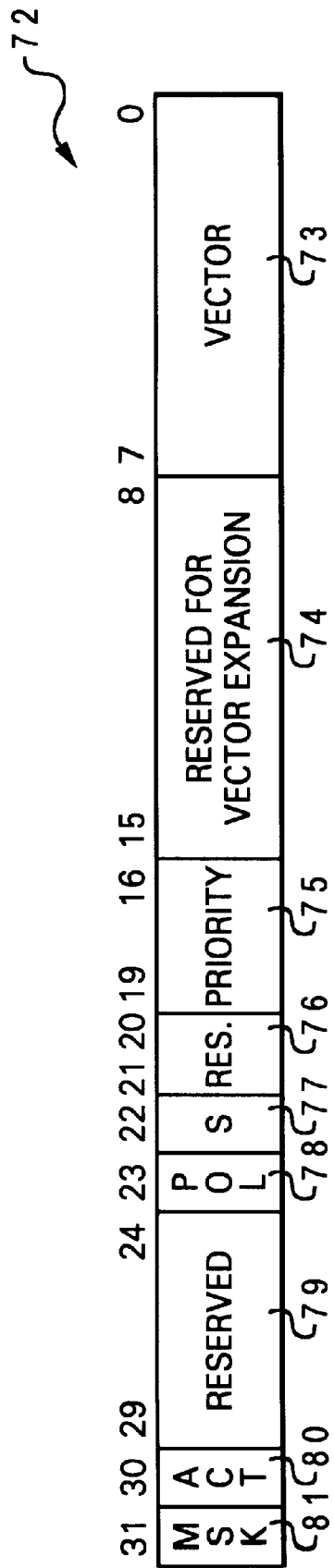
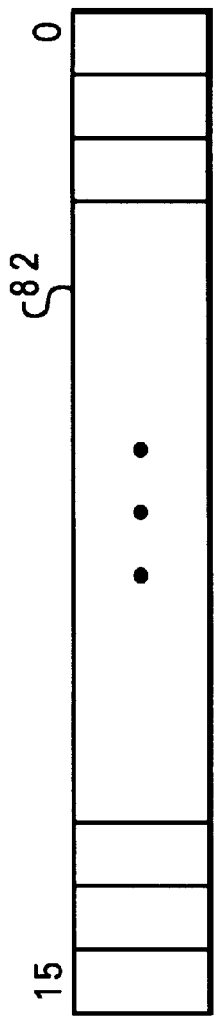
Fig. 3A
Fig. 3B

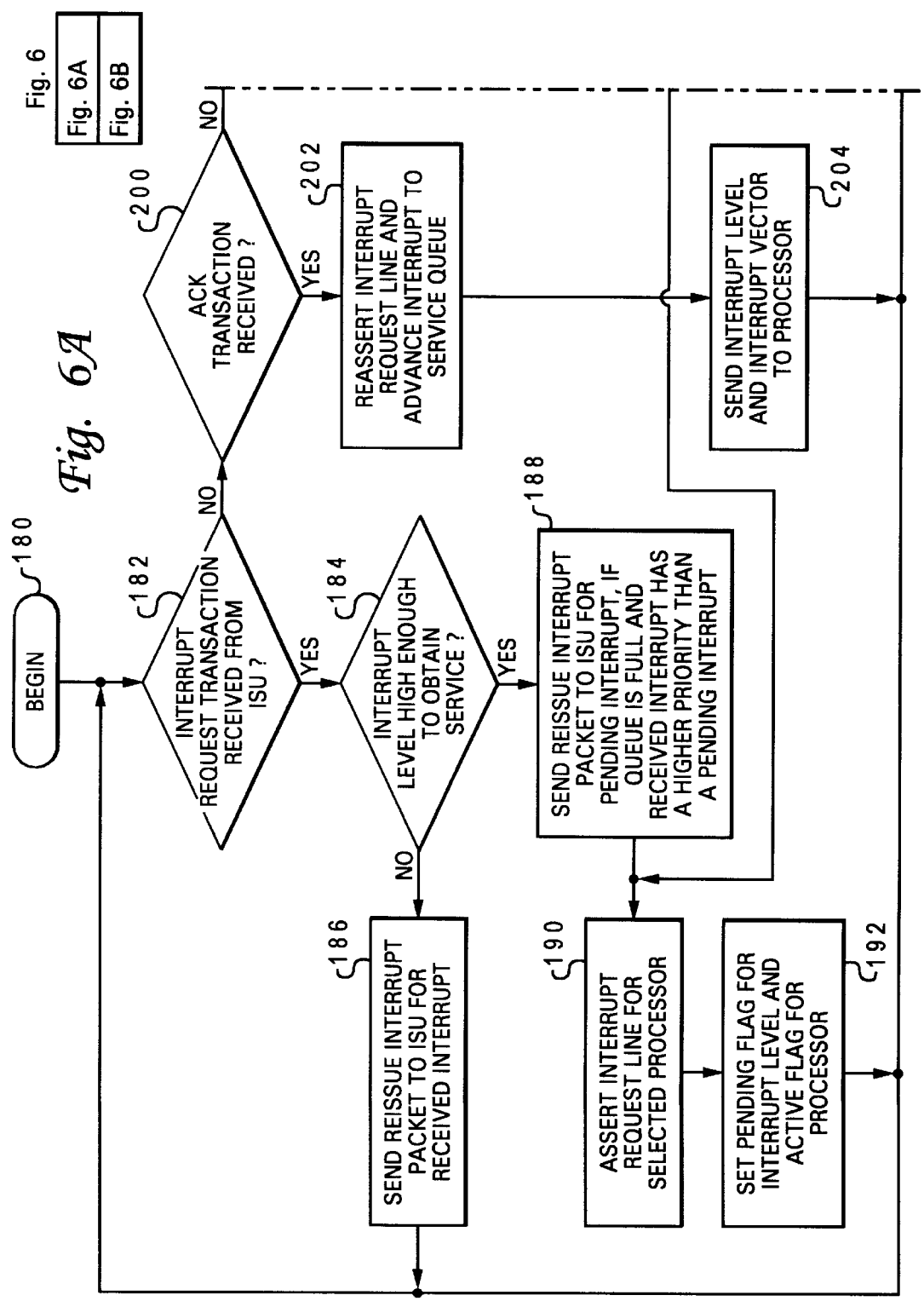

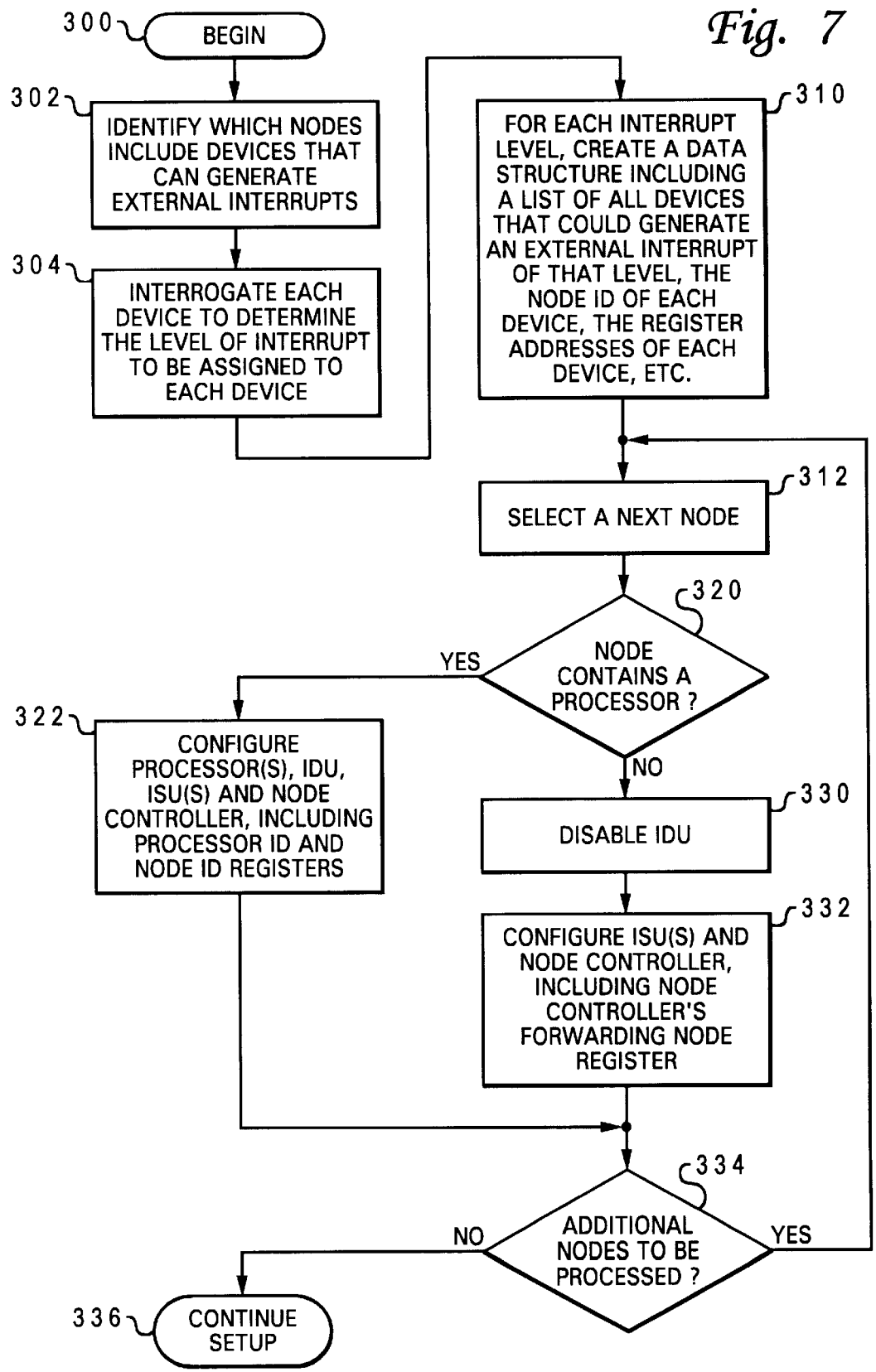

INTERRUPT ARCHITECTURE FOR A NON-UNIFORM MEMORY ACCESS (NUMA) DATA PROCESSING SYSTEM

BACKGROUND OF THE INVENTION

1. Technical Field

The present invention relates in general to data processing and, in particular, to data processing in a non-uniform memory access (NUMA) data processing system. Still more particularly, the present invention relates to an interrupt architecture for a NUMA data processing system.

2. Description of the Related Art

In computer systems, interrupts are often utilized to alert a processor to the occurrence of an event that requires special handling. Interrupts may be utilized, for example, to request service from a recipient processor, report an error condition, or simply communicate information between devices. In uniprocessor computer systems, interrupt support is relatively straightforward since all interrupts are handled by the single processor. In multiprocessor computer systems, however, an additional level of complexity is introduced because some mechanism must be utilized to route interrupts to a particular processor or processors for handling.

In conventional symmetric multiprocessor (SMP) computer systems, interrupts have been handled in a variety of ways, utilizing both hardware and software mechanisms. An SMP computer system typically employs a global interrupt controller to select a processor to service an interrupt based upon the priority of the interrupt and the priority of the process, if any, being executed by each processor. Thus, the interrupt controller compares the priority of the interrupt to the priorities of the processes being executed by the processors and selects as the servicing processor a processor that is executing a process having a lower priority than the interrupt. Because the processors in an SMP are relatively tightly coupled, the determination of the process priorities and the routing of the interrupt to the servicing processor can be accomplished with facility utilizing either the shared system interconnect or dedicated interrupt lines.

Recently, a multiprocessor computer system topology known as non-uniform memory access (NUMA) has emerged. A typical NUMA computer system may include a high latency node interconnect to which are coupled several multi-processor nodes that each contain a local system memory. Because the multiple processors in a NUMA computer system are not tightly coupled, conventional SMP interrupt servicing and communication mechanisms cannot be directly applied in a NUMA computer system. As should thus be apparent, there is a need for an interrupt handling mechanism in a NUMA computer system that provides efficient mechanisms for interrupt routing and communication.

SUMMARY OF THE INVENTION

A non-uniform memory access (NUMA) computer system includes at least two nodes coupled by a node interconnect, where at least one of the nodes includes a processor for servicing interrupts. In accordance with the present invention, the interrupt architecture of the NUMA computer system, which includes both hardware and software components, partitions the NUMA computer system into external interrupt domains so that an external interrupt is always presented to a processor within the external interrupt domain in which the interrupt occurs. Although each such external interrupt domain typically includes only a single node, interrupt channeling or interrupt funneling may be implemented to route external interrupts across node boundaries for presentation to a processor.

Once presented to a processor, interrupt handling software may then execute on any processor within the system to service the external interrupt. Advantageously, the interrupt architecture of the present invention enables interrupt handling software to expeditiously service external interrupts by reducing the size of the interrupt handler polling chain (tree) as compared to prior art methods.

In addition to external interrupts, the interrupt architecture of the present invention supports inter-processor interrupts (IPIs) by which any processor may interrupt itself or one or more other processors in the NUMA computer system. IPIs are triggered by writing to memory mapped registers in global system memory, which facilitates the transmission of IPIs across node boundaries and permits multicast IPIs to be triggered simply by transmitting one write transaction to each node containing a processor to be interrupted.

The interrupt architecture of the present invention scales well from small NUMA computer systems containing a few nodes to large systems containing hundreds of nodes. The interrupt hardware within each node is also distributed for scalability, with the hardware components communicating via interrupt transactions conveyed across shared communication paths (i.e., local buses and interconnects).

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A and 3B respectively depict illustrative embodiments of an interrupt source configuration register and a pending interrupt register within an interrupt source unit (ISU) in accordance with the present invention;

FIG. 7 is a high level logical flowchart of an illustrative embodiment of a configuration routine that configures interrupt resources in accordance with the present invention.

DETAILED DESCRIPTION OF ILLUSTRATIVE EMBODIMENT

1.0 NUMA Computer System Overview

Figure 1:
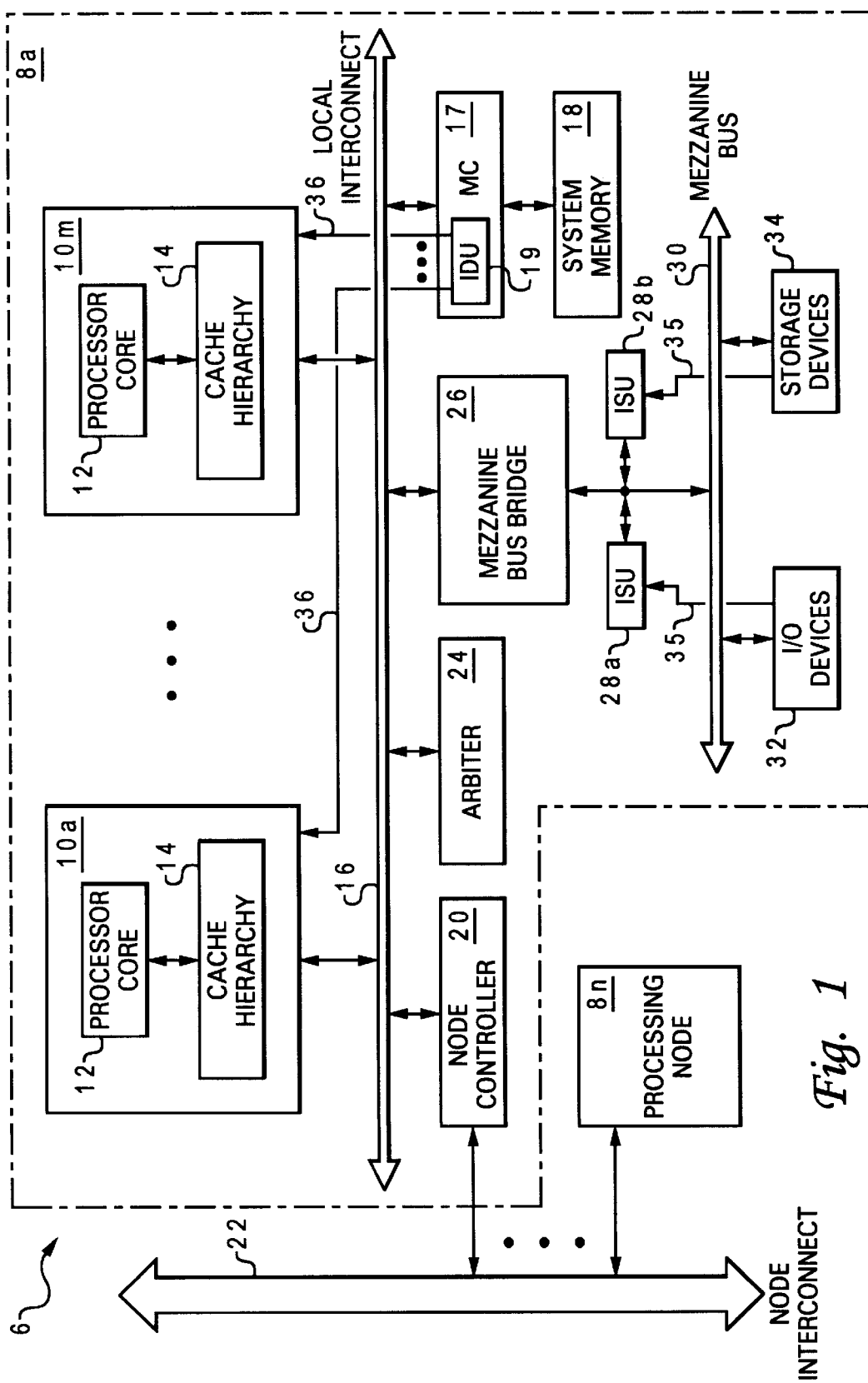
FIG. 1 depicts an illustrative embodiment of a NUMA computer system with which the present invention may advantageously be utilized.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 6 includes a number (N≧2) of processing nodes 8a–8n, which are interconnected by node interconnect 22. Processing nodes 8a–8n each include M (M≧0) processors 10. Processors 10a–10m, if present within a processing node, are preferably identical and may comprise a processor within the PowerPC™ line of processors available from International Business Machines (IBM) Corporation of Armonk, N.Y. In addition to the registers, instruction flow logic and execution units utilized to execute program instructions, which are collectively designated as processor core 12, each of processors 10a–10m also includes an on-chip cache hierarchy 14 that is utilized to stage data to the associated processor core 12 from system memories 18. Each cache hierarchy 14 may include, for example, a level one (L1) cache and a level two (L2) cache having storage capacities of between 8–32 kilobytes (kB) and 1–16 megabytes (MB), respectively. Because data stored within each system memory 18 can be requested, accessed, and modified by any processor 10 within NUMA computer system 6, NUMA computer system 6 preferably implements a cache coherency protocol (e.g., Modified, Exclusive, Shared, Invalid (MESI) or a variant thereof) to maintain coherency both between caches in the same processing node and between caches in different processing nodes.

As shown, processing nodes 8a–8n further include a respective node controller 20 coupled between local interconnect 16 and node interconnect 22. Each node controller 20 serves as a local agent for remote processing nodes 8 by performing at least two functions. First, each node controller 20 snoops the associated local interconnect 16 and facilitates the transmission of local communication transactions to remote processing nodes 8. Second, each node controller 20 snoops communication transactions on node interconnect 22 and masters relevant communication transactions on the associated local interconnect 16. Communication on each local interconnect 16 is controlled by an arbiter 24. Arbiters 24 regulate access to local interconnects 16 based on bus request signals generated by processors 10 and compile coherency responses for snooped communication transactions on local interconnects 16.

Access to each system memory 18 of NUMA computer system 6 is regulated by a respective memory controller (MC) 17. In addition to circuitry that receives and services read and write requests generated by processors 10a–10m, node controller 20, and other devices in its processing node 8, each memory controller 17 contains an interrupt destination unit (IDU) 19, which, as described below, contains a number of registers and associated logic that facilitate the routing and handling of interrupts.

Local interconnect 16 is coupled, via mezzanine bus bridge 26, to a mezzanine bus 30, which may be implemented as a Peripheral Component Interconnect (PCI) local bus, for example. Mezzanine bus bridge 26 provides both a low latency path through which processors 10 may directly access devices among I/O devices 32 and storage devices 34 that are mapped to bus memory and/or I/O address spaces and a high bandwidth path through which I/O devices 32 and storage devices 34 may access system memory 18. I/O devices 32 may include, for example, a display device, a keyboard, a graphical pointer, and serial and parallel ports for connection to external networks or attached devices. Storage devices 34, on the other hand, may include optical or magnetic disks that provide non-volatile storage for operating system and application software.

Both I/O devices 32 and storage devices 34 (as well as other non-processor components of NUMA computer system 6) may generate interrupts for any number of purposes, including signalling receipt of an input, reporting an error condition, etc., via interrupt request lines 35. These interrupts, which are referred to hereinafter as external interrupts to indicate that the interrupts are generated by a component other than a processor 10, are collected by one or more interrupt source units (ISUs) 28a, 28b. Although illustrated separately for clarity, ISUs 28a and 28b may alternatively be integrated into the chipset forming mezzanine bus bridge 26. As described in detail below, ISUs 28 route the external interrupts to an IDU 19, which in turn presents external and other interrupts to local processors 10 for servicing via an interrupt request line 36.

Local interconnects 16 and node interconnect 22 can each be implemented with any bus-based broadcast fabric, switch-based broadcast fabric, switch-based non-broadcast fabric, or hybrid interconnect architecture including both bus and switched-based components. Regardless of which interconnect architecture is employed, local interconnects 16 and node interconnect 22 preferably support split transactions, meaning that the timings of the address and data portions of communication transactions are independent. In order to permit identification of which address and data tenures belong to each communication transaction, the address and data packets that together form a transaction are preferably both marked with the same transaction tag.

Each processor 10 and each other device coupled to a local interconnect 16 is preferably uniquely identified throughout NUMA computer system 6 by a system-wide device ID formed by concatenating the node ID of the processing node 8 within which the device resides with the device's local ID. For example, in an embodiment in which there are a maximum of four processing nodes 8 and at most 8 devices may be coupled to each local interconnect 16, a five bit device ID can be utilized, two high order bits for the node ID and the three low order bits for the device's local ID. Each node ID is preferably maintained in a register within the associated node controller 20, and the local IDs are preferably maintained in device identification registers within each device connected to a local interconnect 16. Each such system-wide device ID may advantageously be utilized as the high order bit portion of each transaction tag generated by the associated device so that the uniqueness of transaction tags throughout NUMA computer system 6 is guaranteed.

1.1 Physical Memory Map

Figure 2:
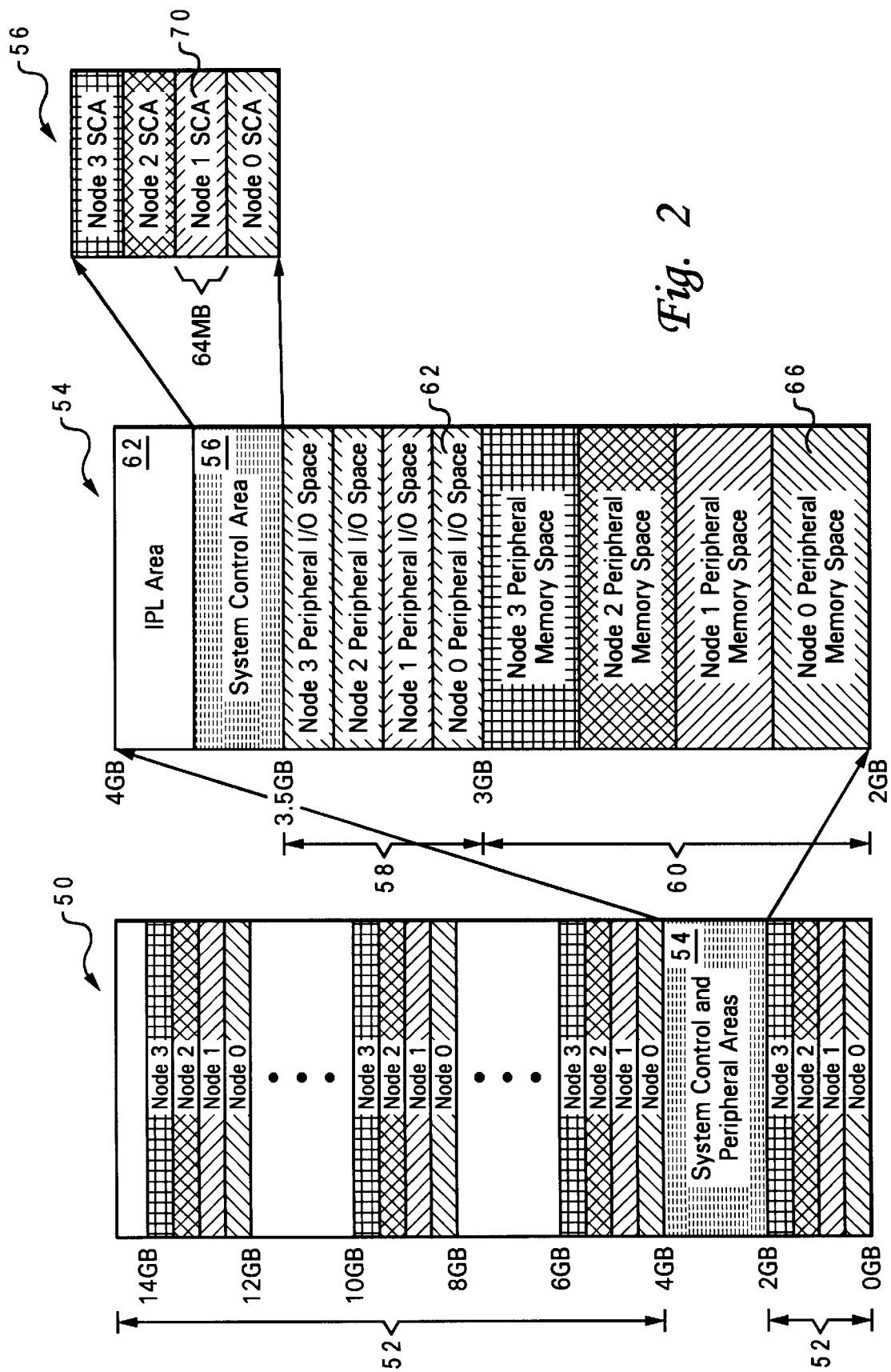
FIG. 2 illustrates an exemplary embodiment of a physical memory map that may be utilized by the NUMA computer system depicted in FIG. 1.

With reference now to FIG. 2, there is illustrated an exemplary physical memory map that may be utilized by an embodiment of NUMA computer system 6 having four processing nodes 8 that each contain a system memory 18. In the embodiment illustrated in FIG. 2, all devices in NUMA computer system 6 share a single 16 gigabyte (GB) physical address space 50 including both a general purpose memory area 52 and system control and peripheral areas 54. Each physical address in general purpose memory area 52 is associated with only a single physical location in one of system memories 18. Thus, the overall contents of the general purpose memory area 52, which can generally be accessed by any processor 10 in NUMA computer system 6, can be viewed as partitioned between all the system memories 18. In the illustrative embodiment, general purpose memory area 52 is divided into 500 MB segments, with each of the four processing nodes 8 being allocated every fourth segment. The processing node 8 that stores a particular datum in its system memory 18 is said to be the home node for that datum; conversely, others of processing nodes 8a–8n are said to be remote nodes with respect to the particular datum.

Still referring to FIG. 2, system control and peripheral areas 54, which contain 2 GB of physical addresses in the illustrated embodiment, include a 256 MB system control area 56, a 0.5 GB peripheral I/O space 58, a 1 GB peripheral memory space 60, and an initial program load (IPL) area 62. IPL area 62 contains addresses reserved for assignment to up to 256 MB of IPL (i.e., boot) code, which is typically stored in a read-only memory (ROM). The IPL code will include a loader for an operating system, such as Advanced Interactive Executive (AIX), which is available from IBM Corporation. As illustrated, the 0.5 GB in peripheral I/O space 58 is divided into equally sized segments 62 that are each allocated to a respective one of processing nodes 8. Peripheral memory space 60 is similarly partitioned into equally sized 256 MB segments 66 that are each allocated to a particular processing node 8.

Like peripheral I/O space 58 and peripheral memory space 60, the physical memory space in system control area 56 includes a number of segments 70 that are each associated with a respective processing node 8. In the illustrated embodiment, each segment 70 contains 64 MB of address space. In addition to addresses intended for storing other per-node control information, each system control area segment 70 includes physical addresses assigned to interrupt registers within the IDU 19 and ISU 28 at the associated processing node 8. As discussed further below, it is these memory-mapped registers that are employed by the present invention to receive and route external interrupts, invoke interprocessor interrupts, and route interrupts between processing nodes 8.

2.0 Interrupt Architecture Overview

The interrupt architecture of the present invention provides for at least three distinct classes of interrupts. First, there are internal interrupts that are triggered by the internal operation of a processor. Internal interrupts may be triggered, for example, by an program exception or overflow/underflow of an internal processor register. Second, as noted above, external interrupts may be generated by devices, such as I/O devices and system timers, that are external to the processors. Third, the present invention also supports inter-processor interrupts (IPIs) which are generated by a first processor in order to interrupt a second processor.

In a preferred embodiment of the present invention, NUMA processing system 6 provides interrupt support for external and IPIs through an interrupt architecture that is compliant with and an extension of the OpenPIC (Open Processor Interrupt Controller) standard. OpenPIC is described, for example, in *Open Programmable Interrupt Controller (PIC) Register Interface Specification Revision 1.2*, October 1995, published jointly by Advanced Micro Devices, Inc. and Cyrix, Inc. and incorporated herein by reference. Although OpenPIC compatibility is preferred, the present invention can be applied to any system having memory mapped interrupt control registers that are unique throughout the system.

The interrupt architecture of the present invention includes both hardware and software components, which are each described below.

2.1 Interrupt Architecture Hardware

In contrast to conventional OpenPIC and other SMP interrupt implementations, which typically utilize a global interrupt controller serving a single interrupt domain, each processing node 8 of NUMA computer system 6 preferably forms its own external interrupt domain, where each external interrupt domain has its own respective IDU 19 and one or more ISUs 28, as shown in FIG. 1. ISUs 28 provide an interface to the interrupt system for interrupt sources, and IDUs 19 provide an interface between the interrupt system and processors 10. In order to promote efficient handling of interrupts and minimize communication of interrupts between interrupt domains, external interrupts received by an ISU 28 are communicated utilizing interrupt packets transmitted across local interconnect 16 (and depending upon implementation, mezzanine bus 30) to only the IDU 19 within the same interrupt domain (i.e., processing node 8) if the processing node 8 is equipped with a processor 10 configured to service interrupts. Communication of configuration information, interprocessor interrupts, interrupt ackhowledgements, end of interrupt commands, and other interrupt-related information between interrupt domains is supported, however, via memory mapped registers in IDU 19, thereby permitting the system-wide utilization of interrupt resources at each processing node 8.

2.1.1 Interrupt Source Unit (ISU) components

With reference now to FIGS. 3A and 3B, illustrative embodiments of an interrupt source configuration register and an interrupt pending register in each interrupt source unit (ISU) 28 are respectively depicted. Each ISU 28 preferably includes at least one such interrupt source configuration register 72 per interrupt source and one interrupt pending register 82 for all interrupt sources supported by that ISU 28.

Referring first to FIG. 3A, each interrupt source configuration register 72 includes a vector field 73 identifying an interrupt vector for the associated interrupt source, an interrupt vector reserved field 74 that may store additional bits for identifying the interrupt vector, and a priority field 75 that indicates the priority of the interrupt generated by the associated interrupt source. In the illustrated embodiment, interrupt priorities range from 0, which is the lowest priority, to 15, which is the highest priority. Interrupt resources are preferably unique within each interrupt domain. Thus, each interrupt domain preferably has only one level 1 interrupt, but there may be up to N level 1 interrupts in NUMA computer system 6. Of course, prior art techniques may be employed to permit interrupt sharing such that multiple interrupt sources within a single processing node 8 share the same interrupt level.

Interrupt source configuration register 72 further includes two reserved fields 76 and 79, a sense bit 77 for indicating whether the interrupt signal is edge or level triggered, a polarity bit 78 for indicating whether the interrupt is active low (or negative edge) or active high (or positive edge), an activity (ACT) bit 80 indicating whether vector field 73 and priority field 75 are in use and cannot be modified, and a mask (MSK) field 73 that enables and disables the receipt by ISU 28 of interrupts generated by the associated interrupt source. Thus, in response to receipt of an interrupt from a particular interrupt source via an interrupt request line, an ISU 28 can determine by reference to the appropriate interrupt source configuration register 72 the enablement and priority of interrupts for the interrupt source, as well as an identifier for the interrupt vector associated with the interrupt.

Once an external interrupt has been received and qualified by ISU 28, ISU 28 sets a bit in pending register 82 of FIG.

3B. The bit, which is uniquely associated with the interrupt source, signifies that the interrupt source has a pending interrupt. Thus, in the embodiment shown in FIG. 3B, each ISU 28 can support a maximum of 16 interrupt sources.

2.1.2 Interrupt Destination Unit (IDU) components

Figure 4:
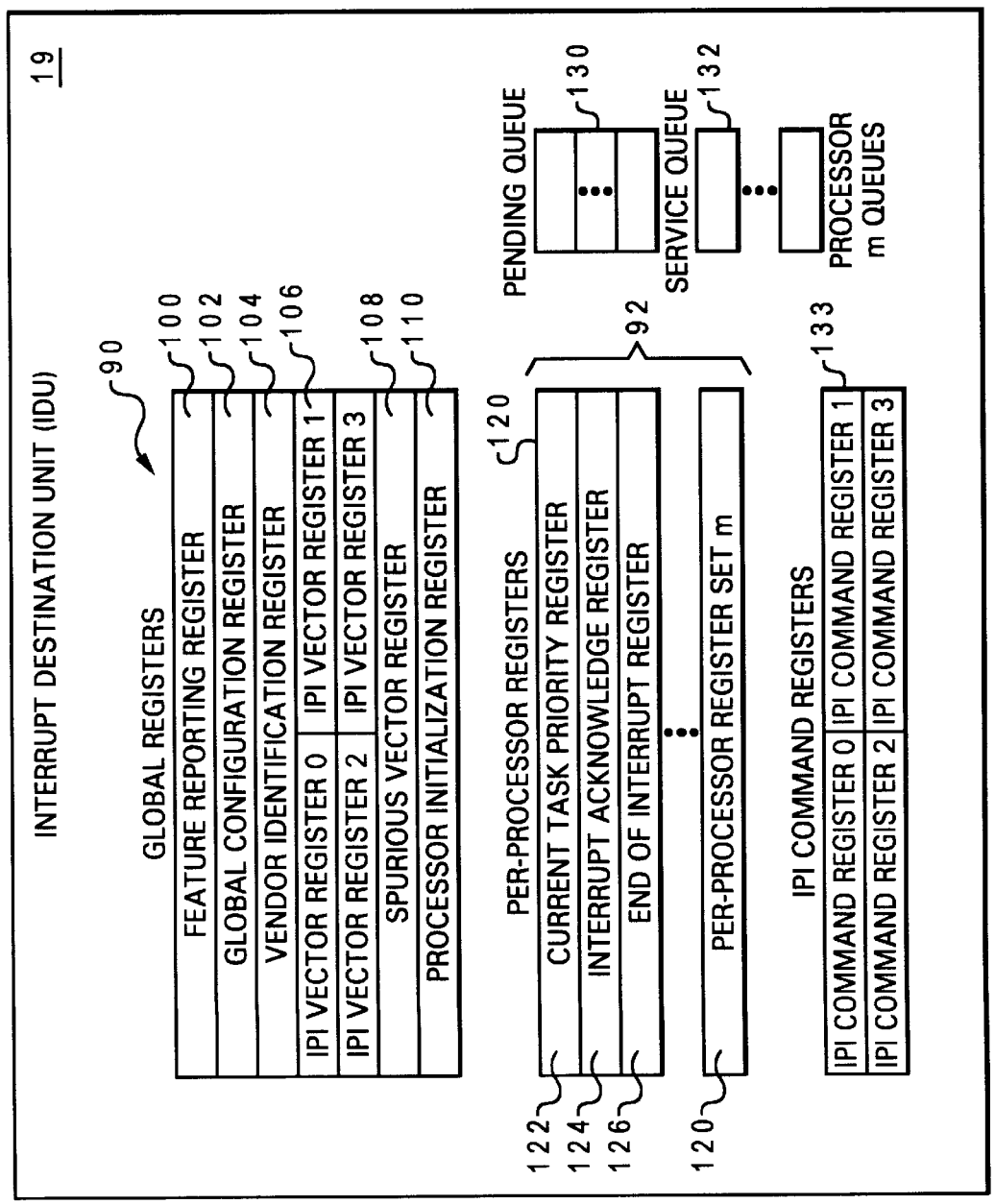
FIG. 4 illustrates a more detailed block diagram of an interrupt destination unit (IDU) in accordance with the present invention.

Referring now to FIG. 4, there is depicted a more detailed block diagram representation of IDU 19 in the memory controller 17 of a processing node 8. The depicted embodiment of IDU 19 is OpenPIC-compliant and includes three distinct register spaces, global registers 90, per-processor registers 92, and inter-processor interrupt (IPI) command registers 133, which are each located within the processing nodes's system control area segment 70 at OpenPIC-defined offsets from base addresses specified in global configuration register 102. In order to simplify addressing, the offset between the base address and the beginning of the processing node's system control area segment 70 is preferably the same for all IDUs 19. For example, in an illustrative embodiment of NUMA computer system 6 including four processing nodes 8 that each contain four processors 10 that all share a 16 GB physical memory space, address bits 30–63 may be defined by the range 000000000h–3FFFFFFFh, with system control area 56 residing at A30. . . A63 0E0000000h–0EFFFFFFFh. If the node number assigned to a processing node 8 is defined by A36. . . A37, with node numbers ranging between b00–b11, system control area segment 70 of the processing node 8 having node number b01 will be located at A30. . . A63 0E4000000h–0E4FFFFFFh. Within all system control area segments 70, the base address of the registers in the IDU 19 will be located at a common arbitrary offset, such as 000C0000h. Thus, the base address of the registers of IDU 19 within node number b01 can be obtained by adding 0E4000000h to 000C0000h to yield 0E4C00000h. The individual register spaces and registers within the IDU 19 of node number b01 can then be addressed utilizing OpenPIC-defined offsets as follows:

|  | | |
|---:|:---:|:---|
| 220000h | = | OpenPIC architected offset from the base address specified by global configuration register 102 to per-processor registers 120 of processor b10 at node b01 |
| + 0E4C00000h | = | base physical address of registers in IDU 19 of node number b01 |
| 0E4C220000h | = | physical address of per-processor registers 120 of processor b10 at node number b01 |
| 0040h | = | OpenPIC architected offset from the per-processor registers 120 to IPI command port 0 |
| + 0E4C220000h | = | physical address of per-processor registers 120 of processor b10 at node number b01 |
| 0E4C220040h | = | physical address of per-processor registers 120 of processor b10 at node number b01 |

As shown in FIG. 4, the global registers 90 in each IDU 19 include a read-and-write feature reporting register 100, a read-and-write global configuration register 102, a read-only vendor identification register 104, one read-and-write inter-processor interrupt (IPI) vector register 106 for each IPI command port (described below), a read-and-write spurious vector register 108, and a read-and-write processor initialization register 110. Global registers 90 are OpenPIC-defined and contain the following information:

Feature reporting register 100: total number of interrupt sources detected by IPL code in the processing node and the total number of supported processors for that processing node.

Global configuration register 102: base address of global register space for the processing node.

Vendor identification register 104: identifies the vendor of the integrated circuit chip containing IDU 19 and the revision level.

IPI vector registers 106: vector and priority information for each respective IPI register in the processing node.

Spurious vector register 108: vector that is returned when an interrupt acknowledge is received from a processor and there is no pending interrupt for the processor.

Processor initialization register 110: software reset signals for each processor supported in the processing node.

Because global registers 90 are shared by all processors 10 in NUMA computer system 6, software interrupt setup and handling routines in the PAL layer of the AIX operating system are utilized to maintain consistency between the global registers 90 in all of processing nodes 8a–8n. Updates to write-enabled registers other than processor initialization register 110 are performed by a processor 10 initiating N separate write transactions on its local interconnect 16. The write transaction targeting the local IDU 19 are received and serviced by the local memory controller 17. The remainder of the write transactions are forwarded by the local node controller 20 to the node controllers 20 of other processing nodes 8, which in turn source the write transactions to their associated IDU 19 via local interconnect 16. Access to global registers 90 is regulated by a global software lock to ensure that only one processor 10 is updating global registers 90 at any one time. During updates to global registers 90, all interrupts are masked until the updates have been performed at each processing node 8 in order to avoid interrupts being issued with stale settings. A load of a value from global registers 90 entails simply performing a read to the local copy of global registers 90 since all global registers 90 are synchronized.

Still referring to FIG. 4, per-processor registers 92 include M register sets 120, one for each processor 10 that may be supported by a processing node 8. Per-processor registers 92 are also OpenPIC-defined, and each register set 120 includes a read-and-write current task priority register 122, a read-only interrupt acknowledge register 124, and a read-only end of interrupt (EOI) register 126. The register set 120 for a particular processor can be located utilizing the base address contained in global configuration register 102, the processor ID, and the OpenPIC architected offset, as described above. Per-processor registers 120 serve the following functions:

Current task priority register 122: indicates the relative task priority of the current task when no interrupts are being serviced. For an interrupt to issue to a processor, the interrupt priority must be higher than the current task priority for that processor.

Interrupt acknowledge register 124: when read by software to acknowledge an interrupt, the hardware supplies the interrupt vector of the pending interrupt for the associated processor; if no interrupt is pending, the spurious interrupt vector will be supplied.

End of interrupt (EOI) register 126: written by software to issue an EOI to the highest in service interrupt for the processor that issued the EOI command. Writing the EOI register for an external interrupt causes memory controller 17 to issue an EOI interrupt transaction on local interconnect 16.

The third register space within each IDU 19 is a set of IPI command registers 133 that includes one IPI command register for each level of IPI interrupt, which in OpenPIC-compliant systems is 4. Each IPI command register 133 contains at least M bits, where each bit position corresponds to a processor ID of one of the M local processors 10. Thus, writing a b'1' to a particular bit position within an IPI command register 133 causes an IPI of the appropriate level to be issued to the specified processor 10, as discussed further below. The status of the N sets of IPI command registers 133 is collectively maintained in a master set of IPI command registers in the general purpose memory space by interrupt handling software. For example, if each of four processing nodes 8 in an exemplary NUMA computer system supports a maximum of 8 processors, the master set of 4 IPI command registers maintained can each have 32 bits, where bits 0–7 correspond to processors 0–7 of processing node 0, bits 8–15 correspond to processors 0–7 of processing node 1, etc.

In addition to the global registers 90, per-processor registers 92, and IPI command registers 133 described above, each IDU 19 may also contain global timer interrupt sources and other OpenPIC-defined or other registers.

2.1.3 Interrupt Source Unit (ISU) operation

Figure 5:
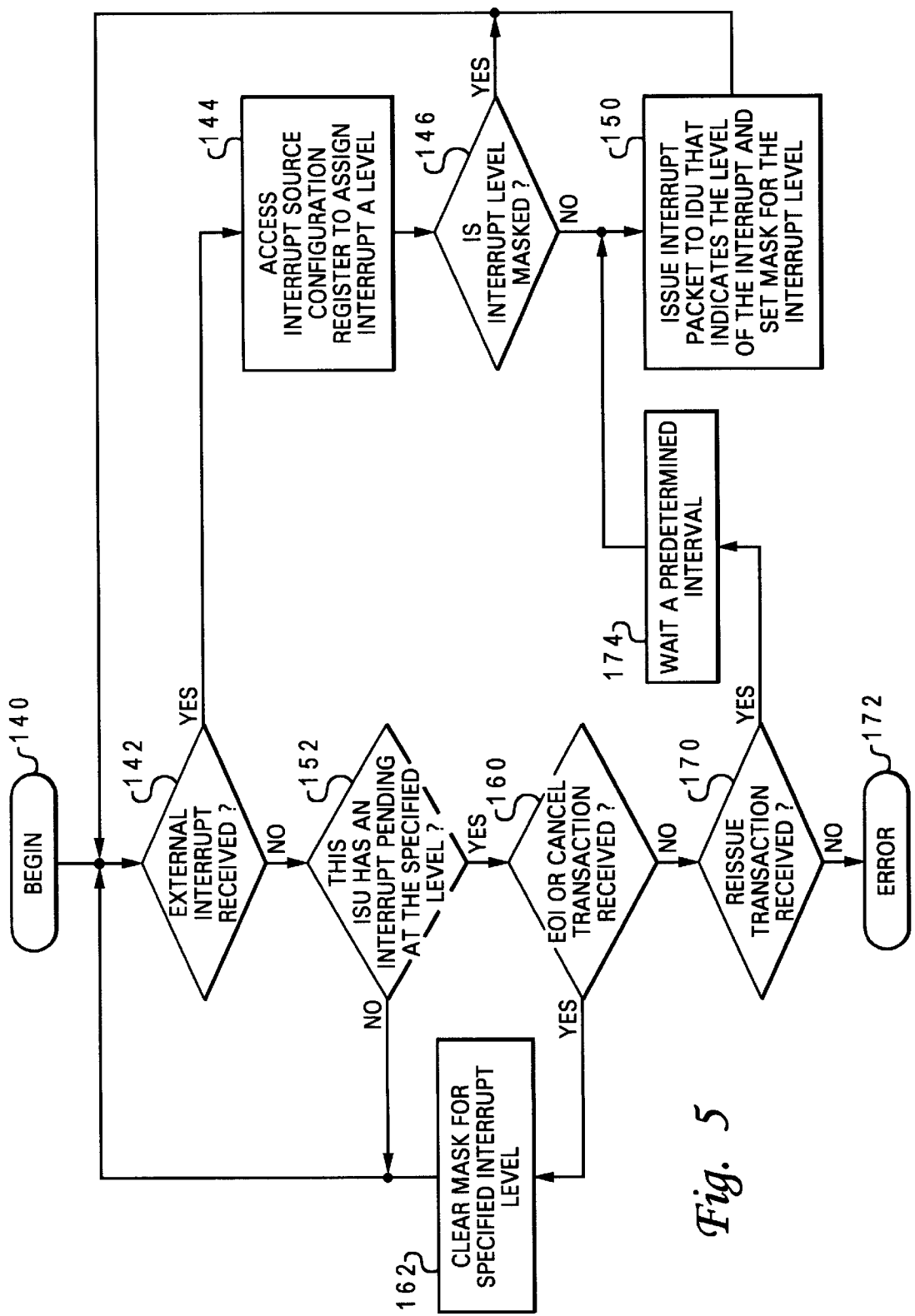
FIG. 5 is a high level logical flowchart of the operation of an ISU in accordance with the present invention.

With reference now to FIG. 5, there is depicted a high level logical flowchart of the operation of an ISU 28 in accordance with the present invention. As illustrated, the process begins at block 140 in response to receipt of an input by ISU 28 and thereafter proceeds to block 142. If the input is an interrupt packet received from the bus (i.e., local interconnect 16 or mezzanine bus 30), the process passes to block 152, which is described below. If, however, the input is an external interrupt (i.e., assertion of an interrupt request line by an interrupt source), the process proceeds from block 142 to block 144, which illustrates ISU 28 accessing the appropriate interrupt source configuration register 72 to assign the interrupt a level. ISU 28 then determines at block 146 whether or not interrupts at the level of the received external interrupt are currently masked by reference to interrupt source configuration registers 72. As noted above, in a preferred embodiment of the present invention, at most one interrupt of any given level is active within each processing node 8 at any given time. If interrupts at the level of the received external interrupt are masked, ISU 28 takes no further action at the present time, and the interrupt source must continue to assert the interrupt request line 35 or reassert it at a later time. The process then returns to block 142. If, however, a determination is made at block 146 that interrupts at the level of the received interrupt are not masked, ISU 28 issues an interrupt packet to the local IDU 19 via local interconnect 16 (and possibly mezzanine bus 80) indicating the level of the interrupt and the interrupt vector, as shown at block 150. In addition, ISU 28 masks interrupts at the level of the received interrupt. The process then returns from block 150 to block 142, which has been described. Thus, unless interrupt channeling is enabled as described below, all external interrupts are presented to software by hardware within the processing node 8 in which the external interrupts occur.

Referring now to block 152, n response to receipt of an interrupt packet on the bus, ISU 28 determines if it has an interrupt pending at the level specified in the interrupt packet. If not, the interrupt packet, which will be processed by a different ISU 28, is ignored, and the process returns to block 142. If a determination is made at block 152 that the ISU 28 has an interrupt pending at the interrupt level specified in the interrupt packet, the process proceeds to block 160. Block 160 depicts a determination of whether or not the bus interrupt transaction that was received by ISU 28 is an EOI or cancel interrupt transaction. If so, the process passes to block 162, which illustrates ISU 28 clearing the mask of interrupts for the interrupt level specified in the bus interrupt transaction. The process then returns to block 142, which was described above.

If, on the other hand, ISU 28 determines at block 160 that the received bus interrupt transaction is not an EOI or cancel interrupt transaction, the process passes to block 170, which depicts a determination of whether or not the bus interrupt transaction is a reissue transaction that requests ISU 28 to reissue an interrupt at the specified level at a later time. If the bus interrupt packet is not a reissue transaction or other defined interrupt packet, the process passes to block 172, which illustrates ISU 28 performing an appropriate error handling function. If, however, the bus interrupt transaction is a reissue transaction, the process passes to block 174. Block 174 depicts ISU 28 waiting an implementation-dependent interval of time (e.g., a predetermined number of clock cycles) before reissuing the interrupt packet to IDU 19, as shown at block 150.

2.1.4 Interrupt Destination Unit (IDU) operation

Figure 6B:
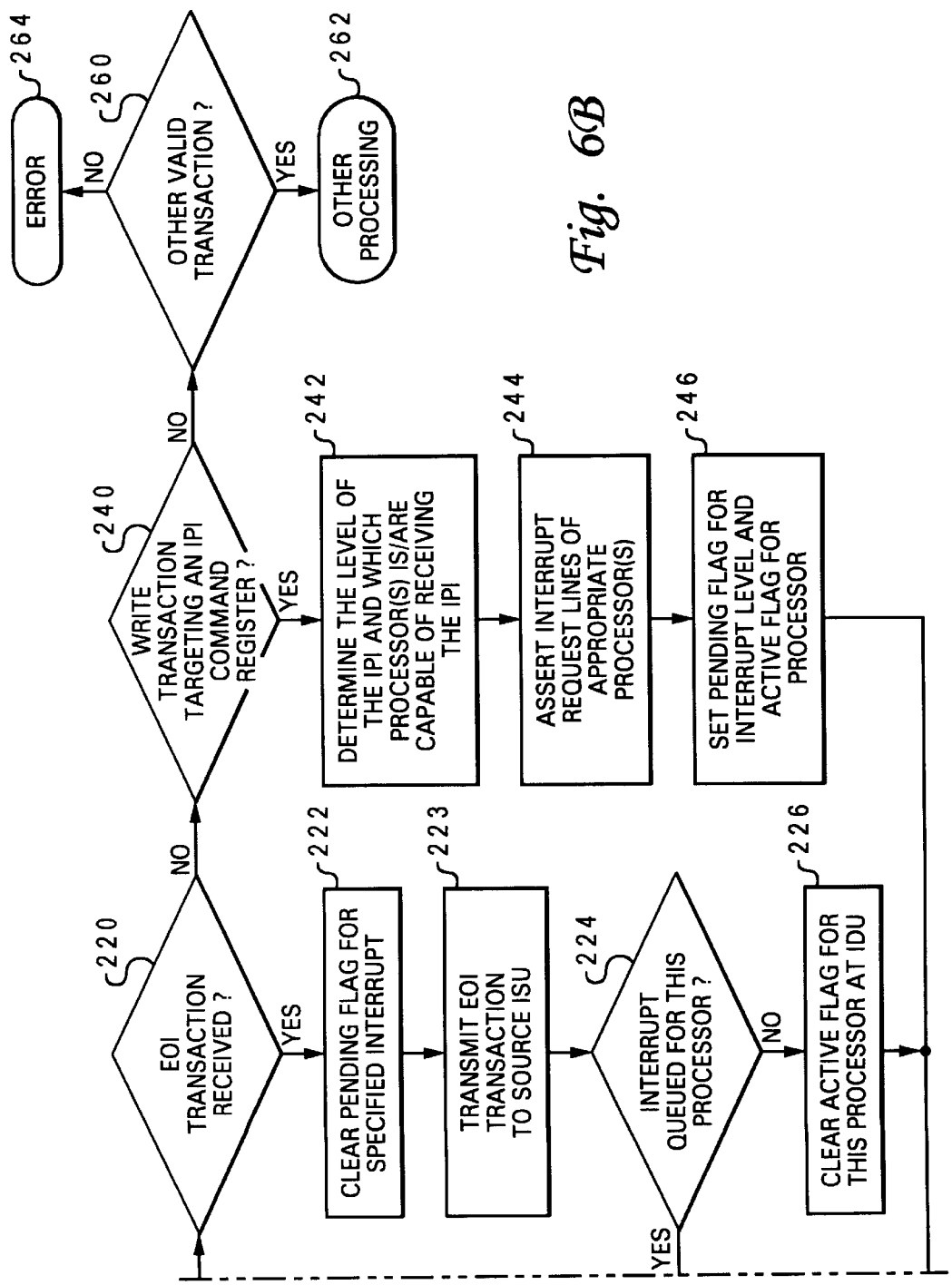
FIG. 6 is a high level logical flowchart of the operation of an IDU in accordance with the present invention.

With reference now to FIG. 6, there is depicted a high level logical flowchart of operation of IDU 19 when processing its inputs. As indicated, the process begins at block 180 in response to receipt of an input by an IDU 19 and thereafter proceeds to block 182. Block 182 illustrates IDU 19 determining whether the input is an interrupt request packet issued by an ISU 28. If not, the process passes to block 200, which is described below. However, if the input received by IDU 19 is an interrupt request packet issued by an ISU 28, the process proceeds to block 184, which depicts a determination of whether or not the interrupt level specified in the interrupt request packet is (1) greater than the priority level specified in the current task priority register 122 of any processor 10 in the local processing node 8 not currently servicing an interrupt, or (2) high enough to obtain an entry in the pending queue 130 of a processor 10. If not, the process passes to block 186. Block 186 depicts IDU 19 transmitting a reissue interrupt packet on local interconnect 16, which is received and processed by an ISU 28 as described above with respect to FIG. 5. A similar reissue interrupt packet may also have to be sent, as depicted at block 188, if an interrupt in the pending queue 130 has a lower level than the newly received interrupt and the pending queue 130 is full, causing the pending interrupt to be evicted from pending queue 130 in favor of the new interrupt.

Following blocks 184 and 188, the process proceeds to block 190, which illustrates IDU 19 asserting the interrupt request line 36 of the processor 10 to which the interrupt was queued at block 184. In addition, as illustrated at block 192, IDU 19 sets a pending flag for the level of the interrupt and sets an active flag for the interrupted processor within the associated current task priority register 122. The process then returns to block 182, which has been described.

Returning to block 182, if an input received by IDU 19 is not an interrupt request packet, IDU 19 determines at block 200 whether or not the received input transaction is an interrupt acknowledge (ACK) transaction transmitted on local interconnect 16 by a local processor 10 to acknowledge receipt of an interrupt. If not, the process proceeds to block 220, which is described below. However, if the input received by IDU 19 is an interrupt acknowledge transaction, the process passes to block 202, which depicts IDU 19 deasserting the interrupt request line 36 and advancing the pending interrupt from pending queue 130 into the processor's service queue 132 by storing at least the interrupt level in a service queue entry. As illustrated at block 204, IDU 19 then transmits an interrupt transaction containing the interrupt level and the interrupt vector to the servicing processor 10 via local interconnect 16. If for some reason, an interrupt ACK transaction is received by IDU 19 when there is no pending interrupt for the transmitting processor 10, the spurious interrupt vector contained in the spurious vector register 108 is supplied to the processor 10. The process then returns to block 182.

Following servicing of an interrupt, the servicing processor 10 will issue to IDU 19 an end of interrupt (EOI) write transaction, as depicted in FIG. 6 by the process passing from block 182 to block 200 to block 220 and then to block 222. Block 222 illustrates IDU 19 clearing the pending flag for the level of interrupt contained in the EOI write transaction. As shown at block 223, IDU 19 also issues an EOI transaction to local interconnect 16 to clear the bit set for the interrupt in pending register 82 of the source ISU 28, as discussed above with respect to blocks 160 and 162 of FIG. 5. As depicted at block 224, if another interrupt is present in the pending queue 130 of the interrupted processor 10, the processor 10 is notified of the queued interrupt, as indicated by the process passing to block 190, which has been described. Alternatively, if no further interrupts are pending for the interrupted processor 10, IDU 19 clears the active flag for the interrupted processor 10 at IDU 19, as illustrated at block 226. The process thereafter returns to block 182.

Still referring to FIG. 6, if the input transaction received by IDU 19 is not an interrupt request, an ACK transaction, or an EOI transaction, IDU 19 determines at block 240 if the input transaction is a write transaction targeting an IPI command register 133. If not, the process passes to blocks 260–264, which illustrate IDU 19 performing other processing if the received input is valid and otherwise performing appropriate error recovery activity. If, however, the received input is a write transaction targeting an IPI command register 133, then ISU 19 recognizes the input as a trigger for an IPI.

Unlike the external interrupts discussed above, an IPI can be generated by any processor 10 in NUMA computer system 6 and can target itself and/or one or more other processors 10 in NUMA computer system 6. Such IPIs are typically employed in order to asynchronously pass messages between the processes running on different processors 10. For IPIs to be supported, setup software executed at system startup first initializes the level of each of the four supported IPIs. Then, during operation of NUMA computer system 6, a source processor 10 selects a target processor or processors 10 as recipients of a message, where the threshold IPI level of each target processor 10 is indicated in that processor's current task priority register 122. The source processor 10 determines by reference to the configuration information and the threshold IPI levels of each target processor 10 what IPI interrupt to utilize to interrupt the selected target processor(s) 10. The source processor 10 then stores the message in a shared memory location that can be accessed utilizing the IPI vector register 106 associated with the chosen IPI. The source processor 10 finally issues a write transaction to each processing node 8 containing a target processor 8, where each such write transaction targets the appropriate IPI command register 133.

As discussed above, it is this write transaction that is decoded by an IDU 19 at block 240 of FIG. 6. From block 240, the process passes to block 242, which illustrates IDU 19 determining what priority (level) is associated with the targeted IPI command register 133 and determining what local processors 10 are accepting interrupts of that level, for example, by reference to IPI vector registers 106. Once the local target processor(s) 10 are determined, IDU 19 asserts the interrupt request line(s) of the target processor(s) 10, sets the pending flag for the interrupt level of the IPI, and sets the active flag for the target processor(s) 10, as shown at blocks 244 and 246. Thereafter, the process returns to block 182.

2.1.5 Interrupt Channeling

For some applications of NUMA computer system 6, it may be advantageous to augment certain resources, such as system memory 18, I/O devices 32, or storage devices 34, without increasing the processing resources of NUMA computer system 6. In such cases, it is desirable to include one or more nodes 8 containing no processors 10. However, in view of the above-described partitioning of NUMA computer system 6 into per-node interrupt domains, some mechanism is required to handle external interrupts generated by interrupt sources in processorless nodes 8. In accordance with a preferred embodiment of the present invention, the handling of external interrupts generated by processorless nodes 8 is accomplished by interrupt channeling.

To effect interrupt channeling, the local IDU 19 (if present) is disabled, and the node controller 20 of each processorless node 8 is set to a forwarding mode in which the node controller 20 of the processorless node 8 accepts interrupt packets sourced by local ISUs 28 and forwards the interrupt packets to a designated "foster" node 8 that includes at least one processor 10 and one IDU 19. This forwarding mode may be controlled, for example, by a mode register in the processorless node's system control area segment 70 that is written by configuration software at system startup, where the mode register includes a mode control bit and a foster node identifier.

In response to receipt of the interrupt transactions forwarded across node interconnect 22, the node controller 20 of the foster node 8 runs the interrupt transactions on its local interconnect 16. The IDU 19 at the foster node 8 then claims the interrupt packets and presents the interrupts to the local processors 10 for servicing, as described above. Any interrupt packets generated by the IDU 19 at the foster node 8 are also transmitted to the source ISUs 28 at the processorless node 8. Thus, using interrupt channeling, the interrupt sources and ISUs of remote processorless nodes 8 are included within the interrupt domain of a designated foster node 8, and external interrupts are handled utilizing the same types of interrupt transactions as are used to handle external interrupts generated at the foster node 8. Advantageously, by utilizing the point-to-point communication capabilities of node interconnect 22, multiple "foster node"—"child node" relationships can concurrently exist without violating domain independence.

A special case of interrupt channeling during system startup is called interrupt funneling. In interrupt funneling, all external interrupts in a NUMA computer system are temporarily all directed to a master processor that is the first to be configured. After the remainder of the processors have been configured and are therefore able to service interrupts, the partitioning of interrupt domains is enforced.

2.2 Interrupt Software

Referring now to FIG. 7, a high level logical flowchart is given that illustrates a portion of a configuration routine for configuring interrupt resources in accordance with the present invention. As depicted, the portion of the configuration routine shown in FIG. 7 begins at block 300, preferably after initial power on self test (POST) and other low-level hardware initialization code has run, and then proceeds to block 302. Block 302 illustrates the configuration routine identifying which nodes 8 of NUMA computer system 6 contain devices that are capable of generating external interrupts. Next, at block 304, the configuration routine interrogates each device capable of generating external interrupts to determine the level of interrupt that each such device wishes to use. The configuration routine resolves conflicts, if any, between the devices and assigns levels to each of the devices' interrupts. The process proceeds from block 304 to block 310, which depicts the configuration routine creating, for each respective interrupt level, a data structure in general purpose memory that lists all the devices that could generate an external interrupt of that interrupt level, the node ID of each device, and the physical addresses of each device's registers. Depending upon implementation specific details, other information useful in handling interrupts may also be stored within each data structure.

The configuration routine then configures the hardware within each node 8, as depicted at blocks 312–334. After the configuration routine selects a node 8 at block 312, the configuration routine determines if the selected node 8 contains a processor 10. If not, the configuration routine implements interrupt channeling by disabling IDU 19 within the selected node 8, as depicted at block 330, and appropriately configuring the ISU(s) 28 and node controller 20, for example, by writing values to memory-mapped registers. As described above, the configuration of node controller 20 includes setting a forwarding mode bit and specifying a foster node 8 within a forwarding mode register. In addition, the configuration register preferably writes the node ID of the selected node 8 into a node ID register within node controller 20. The process then passes to block 334, which depicts the configuration routine determining if additional nodes 8 remain to be configured. If so, the process returns to block 312, at which the configuration register selects a next node 8 to be processed.

Referring again to block 320, if the configuration routine determines that the node 8 selected at block 312 contains a processor 10, the process passes to block 322. Block 322 depicts the configuration routine configuring processor(s) 10, IDU 19, ISU(s) 28 and node controller 20 within the selected node 8. As indicated, the configuration preferably includes writing the node ID into a node ID register within node controller 20 and writing each processor's own ID into an internal processor ID register. The process then proceeds to block 334, and if further nodes 8 remain to be processed, continues with other setup and configuration activities at block 336.

Figure 8:
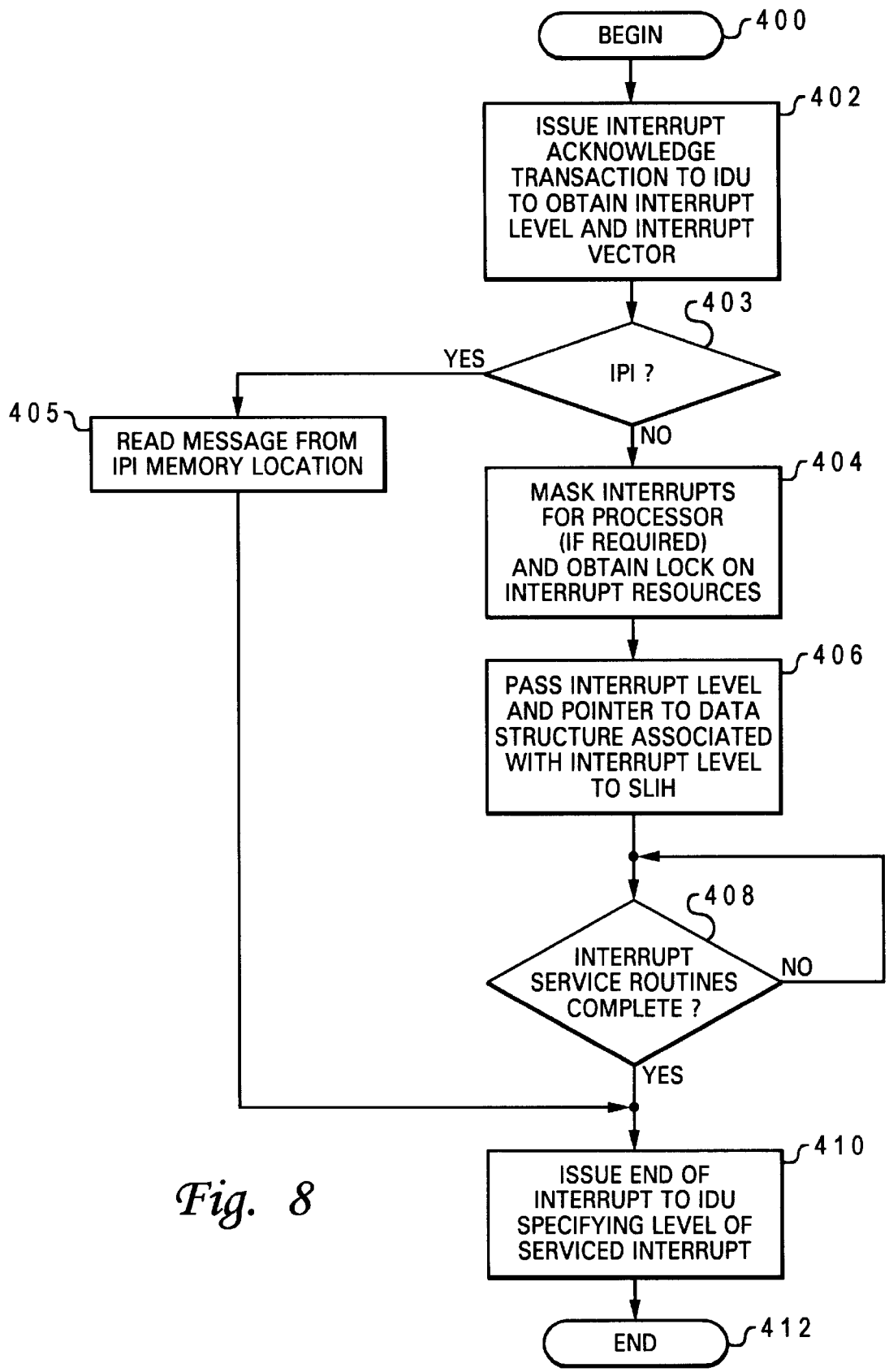
FIG. 8 is a high level logical flowchart depicting the operation of first level interrupt handler (FLIH) software in accordance with the present invention.

With reference now to FIG. 8, a high level logical flowchart illustrates the manner in which first level interrupt handler (FLIH) software facilitate the servicing of an interrupt presented to a processor 10 by IDU 19. As depicted, the process begins at block 400 in response to assertion of an interrupt request line by IDU 19, as discussed above with respect to FIG. 6. In response to assertion of the interrupt request line, processor 10 takes an exception and jumps to the first level interrupt handler, which begins at block 402. Block 402 illustrates the processor 10, operating under control of the FLIH, transmitting an interrupt acknowledge (ACK) transaction to IDU 19 in order to obtain the interrupt level and interrupt vector of the interrupt to be serviced. The FLIH also determines at block 403 whether the interrupt is an IPI or an external interrupt. If the interrupt is an IPI, the process passes to block 405, which illustrates the servicing processor 10 reading a message from the interrupting processor 10 from the shared memory location for the specified IPI level. The process then passes to block 410, which is described below.

Returning to block 403, in response to a determination that the interrupt presented to the processor 10 is an external interrupt, the process passes to block 404. At block 404, the FLIH masks interrupts from IDU 19, if required by the implementation, and obtains a software lock on any exclusive interrupt resources required to service the interrupt. The FLIH then passes the interrupt level and a pointer to that interrupt level's associated data structure to a second level interrupt handler (SLIH), as shown at block 406.

As will be appreciated by those skilled in the art, a SLIH is an interrupt handling routines that performs the operations required to service an interrupt generated by a particular device. Because multiple interrupt sources may generate the same level of interrupt, such SLIHs are typically chained together to form a polling chain so that when the polling chain of SLIHs is processed, each SLIH in the chain polls its associated device (or devices) to determine if the device is the interrupt source, and if so, performs the operations required to service the interrupt. The present invention recognizes that interrupt handling latency is heavily dependent upon the length of the polling chain, which is in turn dependent upon the number of levels of external interrupts and the number of potential interrupt sources in a NUMA computer system. Thus, if NUMA computer system 6 has only 16 levels of external interrupts and the number of potential interrupt sources within NUMA computer system 6 is large, interrupt handling latency will be high. In order to provide improved interrupt handling latency, the present invention reduces the number of SLIHs in the polling chain by eliminating devices in one or more nodes as candidates for the interrupt source.

In a first embodiment, the number of SLIHs in the polling chain is reduced by the FLIH mapping the interrupt level to a node-specific (or superset) interrupt level formed by concatenating (or otherwise combining) the node ID on which the interrupt occurred, which is known to the processor 10 receiving the interrupt, with the conventional interrupt level. Each such node-specific interrupt level would have an associated interrupt data structure created in memory by the configuration routine, where the data structure would list only the devices within the associated node (i.e., interrupt domain) that could generate an external interrupt of the given level. Thus, the interrupt level passed to the first SLIH in the polling chain at block 406 would be the node-specific interrupt level, the pointer provided to the SLIH at block 406 would point to the node-specific interrupt data structure, and the polling chain would include only the SLIHs associated with devices listed in the node-specific interrupt data structure. This first embodiment is advantageous in that multiple interrupt handlers at the same level could run concurrently on processors 10 in different nodes 8 without conflicting over (or having to obtain locks for) interrupt servicing resources, but requires that the FLIH and SLIHs recognize the node-specific interrupt levels.

The number of SLIHs in the polling chain may alternatively be reduced according to a second embodiment in which the FLIH itself passes a subset of the interrupt data structure to the SLIH, where the subset interrupt data structure lists only devices having the same node ID as the processor to which the external interrupt is presented. With devices at other nodes being eliminated from consideration, the polling tree of SLIHs is likely to be shorter. Either of these embodiments may be employed together with interrupt channeling as described above, in which case, the data structure for constructed by the configuration routine for an interrupt domain will contain the devices within both the foster node and the child node.

In any event, once control has been passed to the first SLIH in the polling chain, the FLIH waits for interrupt servicing to complete, as shown at block 408. Importantly, once the interrupt has been passed to the polling chain of SLIHs, the operating system can schedule these SLIHs to execute on any processor 10 in NUMA computer system 6, and may select a different processor 10 to execute the SLIHs in response to load balancing, data affinity, or other criteria. upon completion of the SLIH associated with the interrupt source, control is returned to the FLIH at the processor 10 that originally received the interrupt, which issues an EOI transaction to IDU 19 specifying the level of the serviced interrupt, as shown at block 410 and as discussed above with respect to block 220 of FIG. 6. Thereafter, the FLIH terminates at block 412.

As has been described, the present invention provides an interrupt architecture for a NUMA computer system. The interrupt architecture, which includes both hardware and software components, can be generally described as partitioning the NUMA computer system into external interrupt domains so that an external interrupt is always presented to a processor within the external interrupt domain in which the interrupt occurs. Although each such external interrupt domain typically includes only a single node, interrupt channeling or interrupt funneling may be implemented to route external interrupts across node boundaries for presentation to a processor. Once presented to a processor, software may then execute on any processor within the system to service the external interrupt. Advantageously, the interrupt architecture of the present invention enables interrupt handling software to expeditiously service external interrupts by reducing the size of the interrupt handler polling chain (tree) as compared to prior art methods. In addition to external interrupts, the interrupt architecture of the present invention supports inter processor interrupts (IPIs) by which any processor may interrupt itself or one or more other processors in the system. The present invention utilizes memory mapped registers to trigger IPIs, which facilitates the transmission of IPIs across node boundaries and permits multicast IPIs to be triggered simply by transmitting one write transaction to each node containing a processor to be interrupted. Importantly, the interrupt architecture of the present invention scales well from small NUMA computer systems containing a few nodes to large systems containing hundreds of nodes. The interrupt hardware within each node is also distributed for scalability, with the hardware components communicating via interrupt transactions conveyed across shared communication paths (i.e., local buses and interconnects).

While the invention has been particularly shown and described with reference to a preferred embodiment, it will be understood by those skilled in the art that various changes in form and detail may be made therein without departing from the spirit and scope of the invention. For example, although the present invention has been described with respect to an OpenPIC-compliant embodiment, it should be understood that the present invention is not limited to OpenPIC-compliant systems. Furthermore, although aspects of the present invention have been described with respect to a computer system executing software that directs the method of the present invention, it should be understood that present invention may alternatively be implemented as a computer program product for use with a computer system. Programs defining the functions of the present invention can be delivered to a computer system via a variety of signal-bearing media, which include, without limitation, non-writable storage media (e.g., CD-ROM), writable storage media (e.g., a floppy diskette, hard disk drive, EEPROM), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. A data processing system, comprising:

a plurality of interrupt domains that each include at least one of a plurality of interconnected nodes, wherein each interrupt domain includes at least one processor capable of receiving external interrupts and at least one interrupt source capable of generating external interrupts, each of said plurality of interrupt domains having respective interrupt hardware that receives an external interrupt generated within that interrupt domain and first presents said external interrupt to a processor within that interrupt domain, wherein said processor to which said external interrupt is first presented invokes servicing of said external interrupt and a processor within a different interrupt domain services said external interrupt;

wherein said interrupt hardware within each interrupt domain includes a globally-accessible memory mapped register utilized to communicate interrupts between interrupt domains, and wherein said interrupts include inter-processor interrupts.

2. The data processing system of claim 1, said interrupt hardware within each of said plurality of interrupt domains including an interrupt destination unit that presents interrupts to processors only within its interrupt domain and at least one interrupt source unit that receives interrupts from interrupt sources.

3. The data processing system of claim 2, wherein said interrupt destination unit and said interrupt source unit communicate interrupt information via a shared interconnect.

4. The data processing system of claim 2, wherein for at least one interrupt domain among said plurality of interrupt domains, at least one interrupt source unit and said interrupt destination unit are located in different ones of said plurality of interconnected nodes.

5. The data processing system of claim 4, wherein the node containing said at least one interrupt source unit contains no processors to which external interrupts can be first presented.

6. The data processing system of claim 2, wherein at least one of said plurality of interrupt domains includes a plurality of interrupt source units.

7. The data processing system of claim 1, wherein said globally-accessible memory mapped register of each of said interrupt domains is assigned a respective physical address, and wherein the physical address of the globally-accessible memory mapped register of each interrupt domain has a uniform offset from a memory area allocated to a node containing said globally-accessible memory mapped register.

8. The data processing system of claim 1, and further comprising:

a plurality of local interconnects that are each located within a respective one of said plurality of interconnected nodes;

a system interconnect; and a plurality of node controllers that each couple one of said plurality of local interconnects to said system interconnect for communication between nodes.

9. The data processing system of claim 1, wherein:

said data processing system further comprises memory within one or more of said processing nodes that stores an operating system and a first level interrupt handler and a second level interrupt handler; and said first level interrupt handler is executed by said processor to which said external interrupt is first presented to invoke servicing of said external interrupt and said second level interrupt handler can be scheduled by said operating system to execute on any processor in said data processing system.

10. A method for handling an external interrupt in a data processing system, said method comprising:

establishing a plurality of interrupt domains that each include at least one of a plurality of interconnected nodes, wherein each interrupt domain includes at least one processor capable of receiving an external interrupt and at least one interrupt source capable of generating an external interrupt, each of said plurality of interrupt domains having respective interrupt hardware;

within a particular interrupt domain among said plurality of interrupt domains, receiving, at said interrupt hardware, an external interrupt generated by an interrupt source within said particular interrupt domain and first presenting said external interrupt to a processor within said particular interrupt domain by said interrupt hardware;

invoking interrupt servicing utilizing said processor of said particular interrupt domain to which said external interrupt is first presented;

communicating said external interrupt and inter-processor interrupts between interrupt domains utilizing a globally-accessible memory mapped register within said interrupt hardware; and servicing said external interrupt utilizing a processor within a different one of said plurality of interrupt domains than said particular interrupt domain.

11. The method of claim 10, said interrupt hardware within each of said plurality of interrupt domains including an interrupt destination unit and at least one interrupt source unit, wherein receiving an external interrupt comprises receiving said external interrupt at said at least one interrupt source unit, and wherein presenting said external interrupt comprises presenting said external interrupt to said at least one processor utilizing said interrupt destination unit.

12. The method of claim 11, and further comprising communicating interrupt information between said interrupt destination unit and said interrupt source unit via a shared interconnect.

13. The method of claim 12, wherein for at least one interrupt domain among said plurality of interrupt domains, communicating interrupt information via a shared interconnect comprises communicating interrupt information via a shared interconnect interconnecting at least two of said plurality of nodes.

14. The method of claim 13, wherein establishing a plurality of interrupt domains includes establishing at least one interrupt domain in which one of said plurality of interconnected nodes contains at least one interrupt source unit and no processors to which external interrupts may be first presented.

15. The method of claim 11, establishing a plurality of interrupt domains comprises establishing at least one of said plurality of interrupt domains including a plurality of interrupt source units.

16. The data processing system of claim 10, and further comprising:

assigning said globally-accessible memory mapped register of each of said interrupt domains a respective physical address, wherein the physical address of the globally-accessible memory mapped register of each interrupt domain has a uniform offset from a memory area allocated to a node containing said globally-accessible memory mapped register.

17. The method of claim 10, wherein invoking servicing of said external interrupt comprises executing a first level interrupt handler and servicing said external interrupt comprises executing a second level interrupt handler.

18. A method of processing an interrupt within a data processing system including a plurality of interconnected nodes, said method comprising:

establishing a plurality of interrupt domains that each include at least one of the plurality of interconnected nodes, wherein each interrupt domain includes at least one processor capable of receiving an interrupt and at least one device capable of generating an interrupt, and wherein devices in multiple of said plurality of interconnected nodes can generate interrupts of the same level;

in response to presentation of an interrupt to a processor for servicing, said interrupt having a level, obtaining a list of devices capable of generating an interrupt of said level;

polling only devices within said list located within a same interrupt domain as said processor in order to identify which device within said list generated said interrupt; and prior to presentation of said interrupt, creating and storing said list in a global memory space accessible to all of said plurality of interconnected nodes.

19. The method of claim 18, and further comprising thereafter executing an interrupt handler associated with said identified device.

20. The method of claim 18, wherein said list contains only devices within a single interrupt domain.

21. A data processing system, comprising:

a plurality of interrupt domains that each include at least one of a plurality of interconnected nodes, wherein each of said plurality of interrupt domains includes at least one processor capable of receiving an interrupt and at least one device that generates interrupts, wherein devices in multiple of said plurality of interconnected nodes can generate interrupts of the same level;

interrupt handler software stored within said data processing system and executable by said processor, wherein said interrupt handler software, in response to presentation of an interrupt having a level to said processor, obtains a list of devices capable of generating an interrupt of said level and polls only devices within said list located within a same interrupt domain as said processor in order to identify which device within said list generated said interrupt; and a global memory space accessible to all of said plurality of interconnected nodes, wherein said list is stored in said global memory space prior to presentation of said interrupt.

22. The data processing system of claim 21, wherein said interrupt handler software is a first level interrupt handler, said data processing system further comprising a second level interrupt handler stored within said data processing system and executable by said processor, wherein said second level interrupt handler is associated with said device, and wherein said first level interrupt handler calls said second level interrupt handler to service said identified device.

23. The data processing system of claim 21, wherein said list contains only devices within a single interrupt domain.

24. A program product for use by a data processing system including a plurality of interrupt domains that each include at least one of a plurality of interconnected nodes, wherein each of said plurality of interrupt domains includes at least one processor capable of receiving an interrupt and at least one device that generates interrupts, and wherein devices in multiple of said plurality of interconnected nodes can generate interrupts of the same level, said program product comprising:

a computer usable medium;

interrupt handler software encoded within said computer usable, medium and executable by the data processing system, wherein said interrupt handler software, in response to presentation of an interrupt having a level to said processor, obtains a list of devices capable of generating an interrupt of said level and polls only devices within said list located within a same interrupt domain as said processor in order to identify which device within said list generated said interrupt; and a configuration routine, encoded with said computer usable medium, that creates said list in global memory space accessible to all of said plurality of nodes prior to presentation of said interrupt.

25. The program product of claim 24, wherein said interrupt handler software is a first level interrupt handler, said program product further comprising a second level interrupt handler encoded within said computer usable medium, wherein said second level interrupt handler is associated with said device, and wherein said first level interrupt handler calls said second level interrupt handler to service said identified device.

26. The program product of claim 24, wherein said configuration routine includes within said list only devices within a single interrupt domain.

\* \* \* \* \*

UNITED STATES PATENT AND TRADEMARK OFFICE
CERTIFICATE OF CORRECTION

PATENT NO. : 6,148,361
DATED : November 14, 2000
INVENTOR(S) : Gary Dale Carpenter Page 1 of 1

It is certified that error appears in the above-identified patent and that said Letters Patent is hereby corrected as shown below:

Column 6,
Line 31, please delete "72" and insert -- 74 --.
Line 32, please delete "82" and insert -- 76 --.

Column 9,
Line 66, please delete "n" and insert -- in --.

Column 19,
Line 23, please delete the comma "," after the word "usable".

Signed and Sealed this

Twenty-third Day of October, 2001

Attest:

*Nicholas P. Godici*

NICHOLAS P. GODICI
*Attesting Officer*  *Acting Director of the United States Patent and Trademark Office*